United States Patent
LeMire et al.

(12)
(10) Patent No.: US 6,336,393 B1
(45) Date of Patent: Jan. 8, 2002

(54) RODLESS PNEUMATIC CYLINDER

(75) Inventors: Mark S. LeMire, Lake Barrington, IL (US); Brent B. Moritz, Uniontown; Mark D. Ruesch, Tallmadge, both of OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/334,019

(22) Filed: Jun. 15, 1999

Related U.S. Application Data
(60) Provisional application No. 60/091,463, filed on Jul. 1, 1998.

(51) Int. Cl.[7] .................................................. F01B 29/00
(52) U.S. Cl. ............................................................. 92/88
(58) Field of Search ...................................... 92/88, 161

(56) References Cited

U.S. PATENT DOCUMENTS

| | | |
|---|---|---|
| 2,200,427 A | 5/1940 | Merz |
| 2,373,455 A | 4/1945 | Carey |
| 2,650,571 A | 9/1953 | Mitchell |
| 2,686,402 A | 8/1954 | Samuel |
| 3,121,371 A | 2/1964 | Graham |

(List continued on next page.)

FOREIGN PATENT DOCUMENTS

| | | |
|---|---|---|
| DE | 28 33 533 | 5/1979 |
| DE | 35 37 124 A1 | 4/1987 |
| DE | 38 02 703 A1 | 8/1988 |
| EP | 0 284 192 A2 | 5/1981 |
| EP | 0 104 364 A1 | 4/1984 |
| EP | 0 135 041 A1 | 3/1985 |
| EP | 0 177 850 A1 | 4/1986 |
| EP | 0 177 880 A1 | 4/1986 |
| EP | 0 190 760 | 8/1986 |
| EP | 0 234 033 | 9/1987 |
| EP | 0 258 195 | 3/1988 |
| EP | 0 350 561 A1 | 1/1990 |
| EP | 0 476 265 A1 | 3/1992 |
| EP | 0 476 265 B1 | 3/1992 |
| EP | 0 499 687 A1 | 8/1992 |
| GB | 398998 | 9/1933 |
| GB | 470088 | 8/1937 |
| GB | 2 002 088 A | 2/1979 |
| JP | 62237103 | 10/1987 |

*Primary Examiner*—Edward K. Look
*Assistant Examiner*—Thomas E. Lazo
(74) *Attorney, Agent, or Firm*—Christopher H. Hunter

(57) ABSTRACT

A rodless cylinder includes a cylinder body with a longitudinal bore closed at both ends, a piston which reciprocates inside the bore of the cylinder body, a longitudinal slot along a surface of the body communicating the bore to the exterior of the body, a slide table which is connected by a coupling member extending through the slot to the piston and which moves in conjunction with the piston against the surface of the cylinder body, and sealing members to cover the slot in the cylinder body. A pair of generally V-shaped bearing members, formed from a synthetic resin, are interposed between the slide table and the cylinder body. The bearing members are received in channels formed in the slide table, and receive wedge-shaped distal ends of sidewalls projecting axially upward from the cylinder body, and inwardly toward each other. The V-shaped bearing members bear against the distal ends of the sidewalls to accommodate horizontal and vertical loads on the table, and allow the slide table to slide smoothly and accurately along the cylinder body. The piston for the rodless cylinder comprises a pair of identical piston portions, which are retained together and coupled as a complete assembly to the slide table by a yoke member. The piston portions each have a complete piston head, and a body portion half, which is axially over-lapped with the body portion half from the other piston portion to form the complete piston body.

33 Claims, 9 Drawing Sheets

U.S. PATENT DOCUMENTS

| | | |
|---|---|---|
| 3,221,610 A | 12/1965 | King et al. |
| 3,454,242 A | 7/1969 | Feder et al. |
| 3,820,446 A | 6/1974 | Granbom et al. |
| 4,057,257 A | 11/1977 | Berg |
| 4,121,840 A | 10/1978 | Berg |
| 4,164,893 A | 8/1979 | Granbom et al. |
| 4,252,285 A | 2/1981 | Hammond et al. |
| 4,373,427 A | 2/1983 | Gariapaty et al. |
| 4,481,869 A | 11/1984 | Gariapaty |
| 4,512,208 A | 4/1985 | Lipinski et al. |
| 4,519,297 A | 5/1985 | Lipinski |
| 4,545,290 A | 10/1985 | Lieberman |
| 4,555,980 A | 12/1985 | Hoglund |
| 4,601,234 A | 7/1986 | Hoinkis |
| 4,664,019 A | 5/1987 | Lipinski et al. |
| 4,664,020 A | 5/1987 | Kaiser ............. 92/88 |
| 4,685,383 A | 8/1987 | Ruchseer |
| 4,694,733 A | 9/1987 | Green |
| 4,724,744 A | 2/1988 | Rosengren |
| 4,773,304 A | 9/1988 | Granbom |
| 4,796,515 A | 1/1989 | Dry |
| 4,813,341 A | 3/1989 | Vaughn |
| 4,829,881 A | 5/1989 | Taki et al. |
| 4,838,147 A | 6/1989 | Grishchenko |
| 4,852,465 A | 8/1989 | Rosengren ............ 92/88 |
| 4,856,415 A | 8/1989 | Noda ............ 92/88 |
| 4,881,454 A | 11/1989 | Granbom |
| 4,891,908 A | 1/1990 | Aquilina |
| 4,898,080 A | 2/1990 | Lieberman |
| 4,926,982 A | 5/1990 | Granbom |
| 4,960,037 A | 10/1990 | Granbom |
| RE33,637 E | 7/1991 | Hoglund |
| 5,138,935 A | 8/1992 | Granbom |
| 5,275,088 A * | 1/1994 | Takada et al. ............ 92/88 |
| 5,277,498 A | 1/1994 | Kawaguchi ............ 92/88 |
| 5,279,207 A * | 1/1994 | Takada et al. ............ 92/5 R |
| 5,305,682 A | 4/1994 | Kaneko ............ 92/5 R |
| 5,311,810 A | 5/1994 | Takada et al. |
| 5,317,957 A | 6/1994 | Miyamoto ............ 92/88 |
| 5,333,535 A | 8/1994 | Miyamoto et al. ............ 92/88 |
| 5,467,685 A | 11/1995 | Hubl |
| D365,352 S | 12/1995 | Miyamoto et al. |
| D367,863 S | 3/1996 | Shiino et al. |
| 5,537,912 A * | 7/1996 | Miyamoto et al. ............ 92/88 |
| 5,555,789 A | 9/1996 | Rosengren et al. |
| 5,996,469 A | 12/1999 | Green ............ 92/88 |

\* cited by examiner

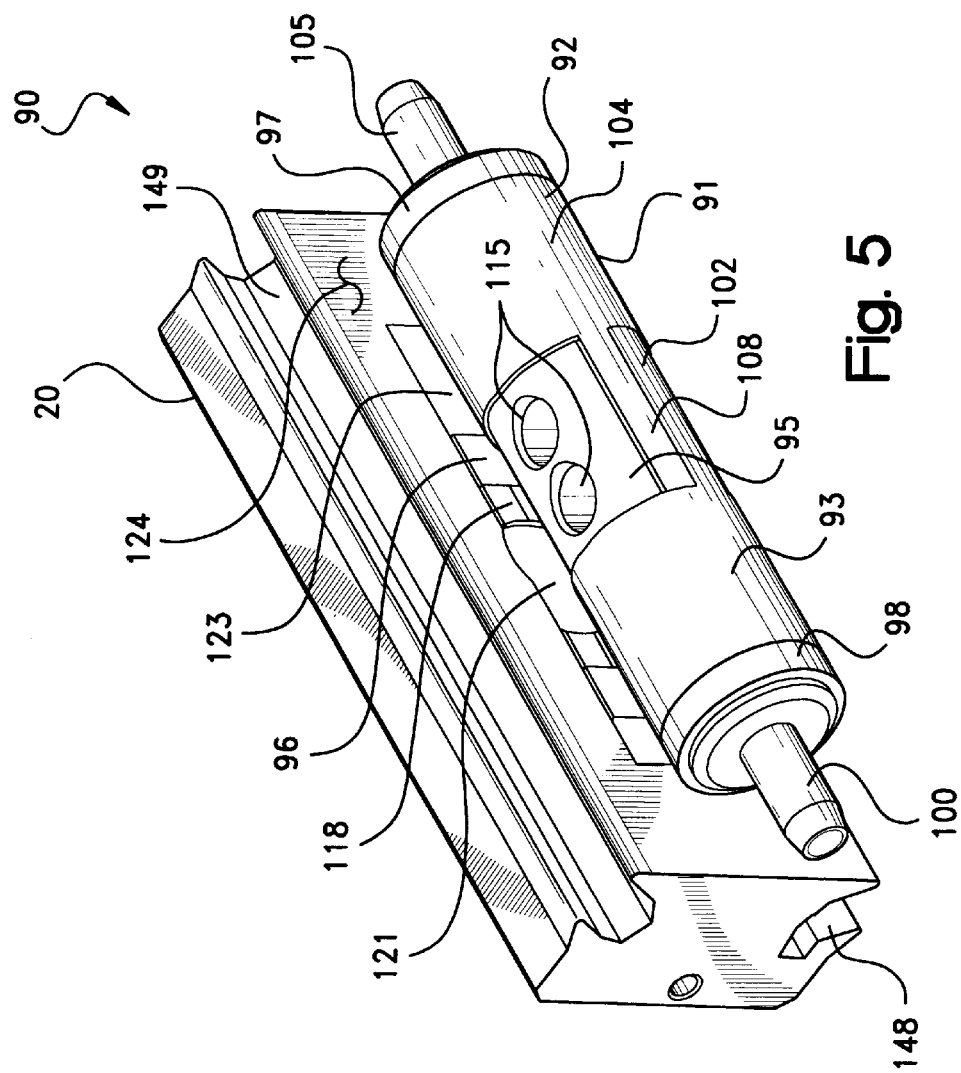
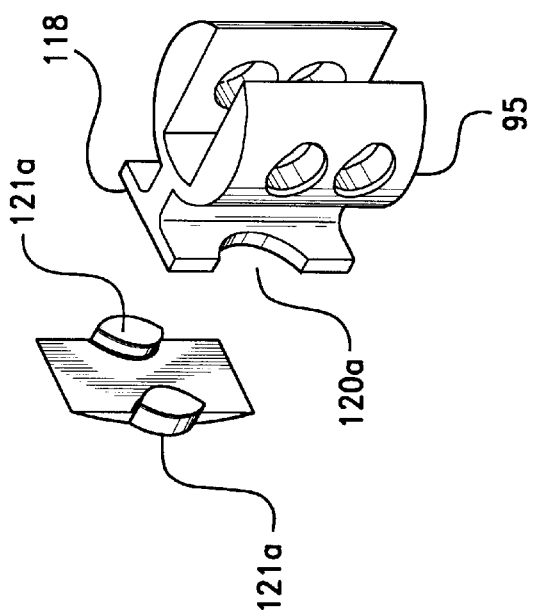
Fig. 4a
Fig. 5

RODLESS PNEUMATIC CYLINDER

RELATED CASES

The present application claims priority to U.S. Provisional Application Ser. No. 60/091,463; filed Jul. 1, 1998.

FIELD OF THE INVENTION

The present invention relates generally to rodless pneumatic cylinders.

BACKGROUND OF THE INVENTION

The term "rodless cylinder" generally refers to a cylinder which does not use a piston rod. Such cylinders use little longitudinal space, and avoid the problems associated with cylinder piston rods, such as bending, rod surface damage, etc. Rodless cylinders have been generally well-received in the marketplace, particularly for long-stroke applications.

Rodless cylinders are known, for example, which include a slide table (or carriage) supported on a cylinder body. The slide table is connected by a coupler member to a piston reciprocating within a bore in the cylinder body. The coupler member extends through a longitudinal slot in the cylinder body to connect the slide table to the piston. A fluid such as air is directed through inlet and outlet ports on the cylinder body to move the piston back and forth along the longitudinal length of the body. The slide table is supported on at least one surface of the cylinder body, and moves in conjunction with the piston. Appropriate seals at both ends of the piston, at each end cap, and along the slot, prevent the fluid from escaping from the cylinder body. If machinery or workpiece components are fixed to the table, the movement of the components can be accurately controlled by the introduction of air into the cylinder body and the movement of the piston and the slide table.

Various cylinder designs have been developed in an attempt to improve the movement of the slide table under various load conditions, to minimize the size and reduce the number of components, and to reduce the manufacturing and assembly costs of the cylinder.

Certain cylinder designs are shown for example in U.S. Pat. No. 5,279,207. One design illustrated in FIG. 10 of this patent shows a slide table supported on a cylinder body by first and second pairs of holding mechanisms. Each holding mechanism includes a pair of guide members fixed to the slide table which are moveable against a pair of synthetic resin members fixed to the cylinder body. The holding mechanisms support the slide table under both vertical and horizontal loads, and allow the slide table to slide smoothly against the cylinder body.

The guide members of the holding mechanisms are disclosed as including guide rollers which are rotatable on rods fixed to the table, while the synthetic resin members are disclosed as including rail-shaped members mounted in grooves formed in channels along the entire length of the cylinder body. It is also disclosed to coat the surfaces of the channels with a synthetic resin film or hard alumite film instead of using the synthetic resin members. In FIG. 18, synthetic members are also shown for the guide members; while in FIG. 20, a guide roller-type of guide member is shown for one of the pairs of guide members, while a synthetic resin member is shown for the other of the pairs of guide members. In any case, the first and second holding mechanisms are shown as being separate components, separately connected to either the slide table and/or the cylinder body, and each appears to require separate manufacturing and assembly steps. All of this increases the over-all cost of the cylinder.

U.S. Pat. No. 5,305,682 show cylinder designs with similar separate holding mechanisms as in U.S. Pat. No. 5,279,207. U.S. Pat. No. 5,311,810 combines the guide roller-type of guide member with a linear guide member having ball bearings. U.S. Pat. Nos. 4,664,020 and 4,891,908 show wedge-shaped guide strips fixed to the slide table and slidingly received in guide grooves in the cylinder body. U.S. Pat. No. 5,317,957 shows a pair of wedge-shaped guide members fixed to the slide table which receive the pointed end of a pair of wedged-shaped guides fixed to the cylinder body. It is believed some of these cylinders can have certain performance issues, as well as additional assembly and manufacturing costs.

Another important factor in manufacturing a rodless cylinder is the piston design. Some references disclose complex piston designs which appear to require numerous components, and manufacturing and assembly steps. This can, again, increase the overall cost of the rodless cylinder.

In light of the above, Applicants believe there is a continual demand for new and unique rodless cylinders which provide for the accurate and smooth positioning of a slide table along a cylinder body for the movement of machine components and workpieces, which are operable under various load conditions, and which are easy to manufacture and assemble to reduce the over-all cost of the cylinder.

SUMMARY OF THE INVENTION

The present invention provides a new and unique rodless cylinder which positions a slide table along a cylinder body for the movement of machine components and workpieces. The rodless cylinder includes a bearing structure which incorporates few parts, provides for the smooth and accurate movement of the slide table on the cylinder body, and is easy to manufacture and assemble. The rodless cylinder also includes a piston structure which likewise is easy to manufacture and assemble. A rodless cylinder constructed according to the principles of the present, improves the movement of the slide table under various load conditions, minimizes the size and reduces the number of components, and reduces the manufacturing and assembly costs associated with the cylinder.

According to the present invention, the bearing structure includes a pair of generally V-shaped bearing members, preferably formed from a synthetic resin, which are interposed between the slide table and the cylinder body. Each bearing member includes first and second longitudinally-extending sidewalls, interconnected by a longitudinally-extending end wall. The slide table includes a pair of channels, with each channel facing generally downwardly and outwardly from the cylinder body. Each channel closely receives and retains a respective bearing member, which thereby also face generally downwardly and outwardly. The bearing members are retained in the channels in the slide table by a pair of end wipers fixed to the ends of the slide table. The cylinder body includes a pair of sidewalls which extend longitudinally along the length of the body on either side of the longitudinal slot in the body. The outer ends of the sidewalls have a wedge shape (in cross-section) and are generally directed inwardly toward each other. The wedge-shaped distal ends are received within the V-shaped bearing members supported in the channels of the slide table to allow the slide table to move smoothly and accurately along the cylinder body.

The V-shaped configuration of the bearing members allows smooth and accurate movement of the slide table under various load conditions. Horizontal and vertical loads are easily compensated by the location and V-shaped structure of the bearing members. Each bearing member, being formed in one piece, is also easy to manufacture and assemble with the cylinder body. The bearing members can also be easily slid into their respective channels before the end wipers are attached to the slide table. At least one of the bearing members is adjustable by a wedge bar, which is moveable by adjusting one or more adjustment screws on the slide table.

The piston for the rodless cylinder preferably comprises a pair of identical piston portions, which are retained together by a yoke member and coupled as a complete assembly to the slide table by the yoke member and a coupler member. The piston portions each have a complete piston head, and a body portion half, which is axially overlapped with the body portion half from the other piston portion to form a complete piston body. Rod magnets are received through corresponding holes in the piston body portions and the yoke to allow position sensing. The piston portions are each easy to manufacture (preferably molded from a resin material) and to assemble with the yoke.

The yoke member of the piston assembly extends through the longitudinal slot in the cylinder body, and is connected by the coupler member directly to the slide table. A disk-shaped portion of the coupler member is received within a press-fit in a circular opening in the lower surface of the slide table to allow limited off-axis movement of the slide table with respect to the piston assembly. The coupler member allows moment loading of the slide table and linearity deviations without compromising the uniform motion of the slide table along the piston body.

An inner sealing band is guided through the piston body while an outer-sealing band is guided between the coupler member and the slide table. The sealing bands fluidly seal the longitudinal slot and prevent contaminants from entering the cylinder bore during movement of the piston assembly. The sealing bands are connected by the use of band clamps and appropriate fasteners to the end caps of the cylinder body.

The invention as described above, improves the movement of the slide table under various load conditions, minimizes the size and reduces the number of components for the rodless cylinder, and reduces the manufacturing and assembly costs associated the cylinder.

Further features of the present invention will become apparent to those skilled in the art upon reviewing the following specification and attached drawings.

BRIEF DESCRIPTION OF THE DRAWINGS

FIG. 4A is an exploded assembly view of certain alternative components for the piston assembly and slide table of FIG. 1;

FIG. 5 is an elevated perspective view of the fully-assembled piston assembly and slide table for the rodless cylinder in FIG. 4;

DETAILED DESCRIPTION OF THE PREFERRED EMBODIMENT

Figure 1:
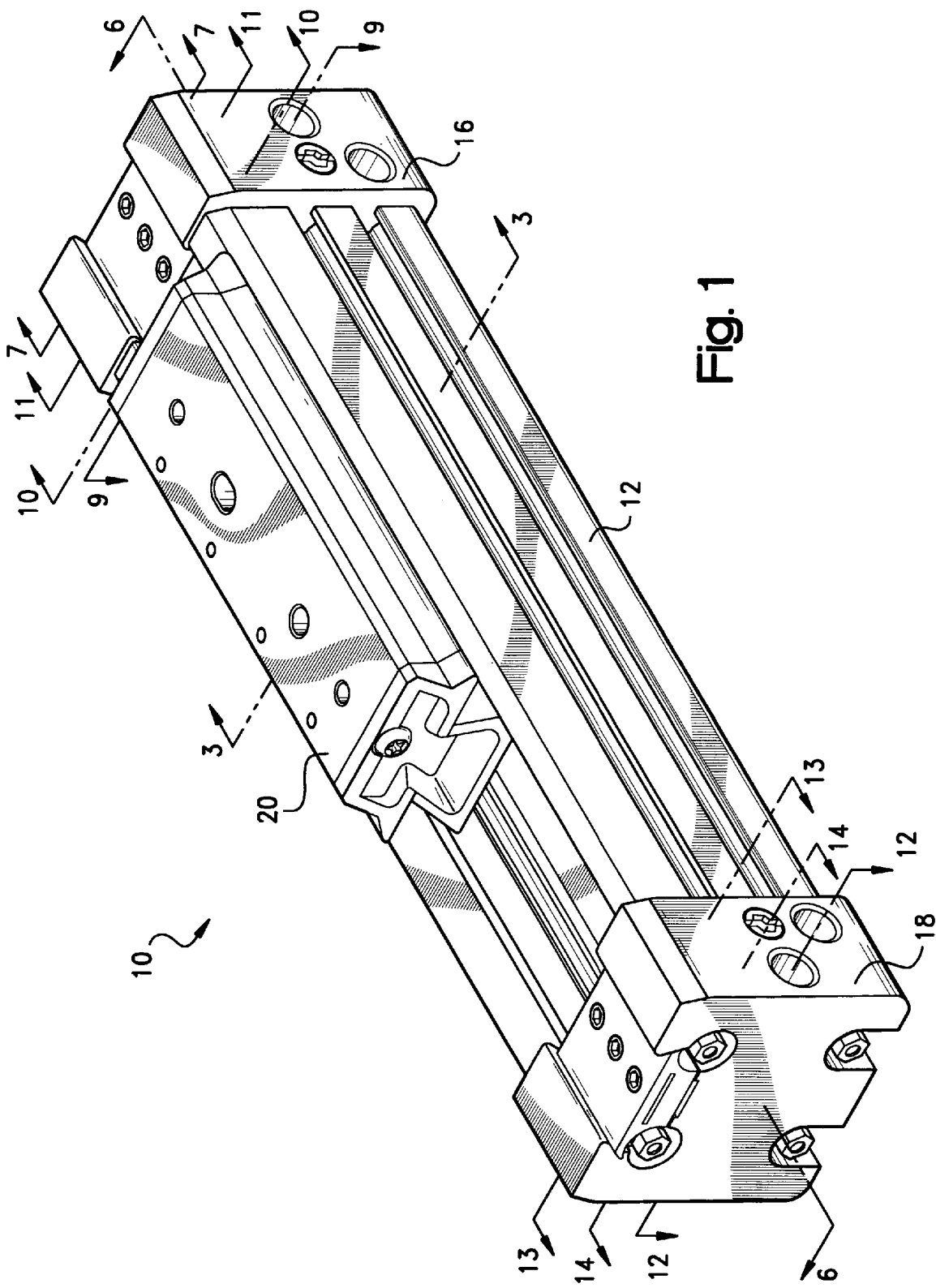
FIG. 1 is an elevated perspective view of a rodless cylinder constructed according to the principles of the present invention.
Figure 2:
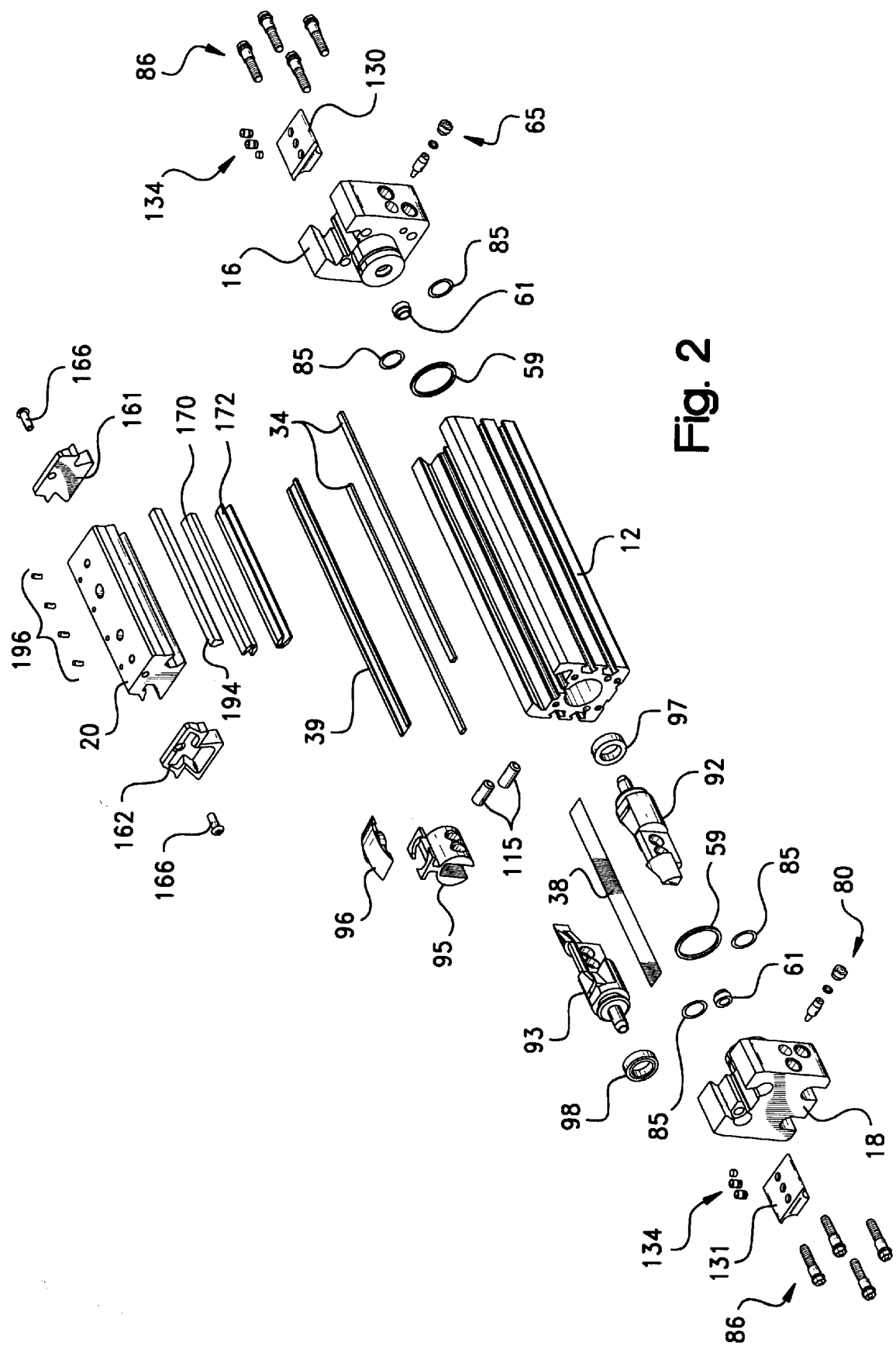
FIG. 2 is an exploded assembly view of the different components of the rodless cylinder of FIG. 1.
Figure 3:
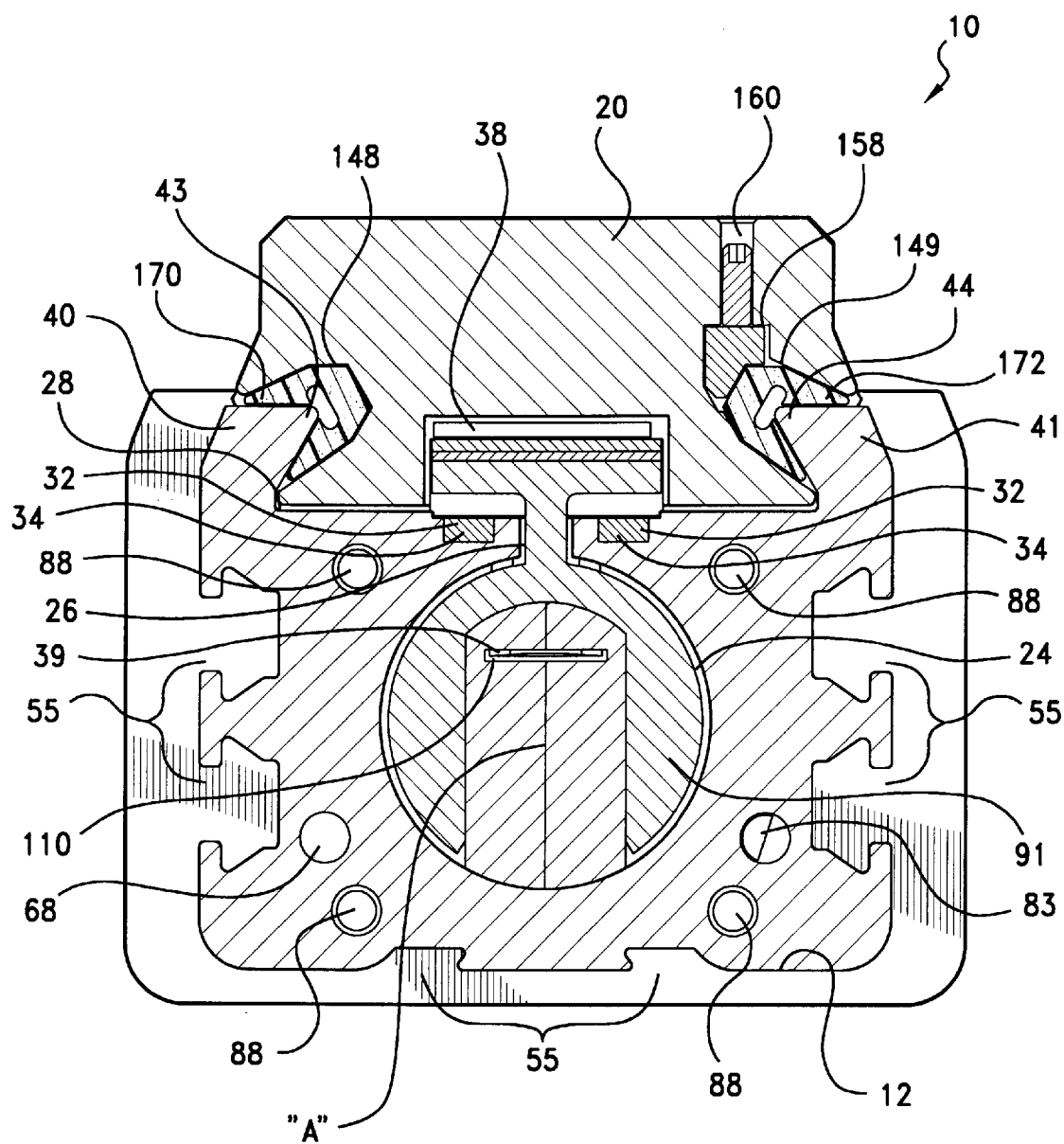
FIG. 3 is a cross-sectional end view of the rodless cylinder taken substantially along the plane described by the lines 3—3 in FIG. 1.

Referring to the drawings, and initially to FIGS. 1–3, a rodless cylinder constructed according to the principles of the present invention is indicated generally at 10. The rodless cylinder 10 includes a cylinder body 12 having a pair of end caps 16, 18, and a slide table or carriage 20, which can smoothly and accurately reciprocate longitudinally along cylinder body 12 between end caps 16, 18, as will be described herein in more detail.

Cylinder body 12 is an elongated member preferably formed by extruding a metal such as aluminum. The body includes a longitudinally-extending circular bore 24, which circumscribes the geometric axis "A" of the body. Bore 24 is open to the exterior of the body at both ends and through a slot 26 extending longitudinally along the length of the body. Slot 26 opens through an upper flat surface 28, along one side of the cylinder body and adjacent the slide table 20. Extending along the sides of the slot 26 are shallow channels 32, each of which receives a magnetic strip 34. A metal outer sealing band 38 covers slot 26 along the length of the cylinder body and is held against surface 28 by magnetic strips 34. A metal inner sealing band 39 is likewise held against the inside surface of the cylinder bore to cover slot 26 along the length of the cylinder body (see also, FIG. 6). Sealing bands 38 and 39 will be described below in more detail.

A pair of longitudinally-extending, spaced-apart sidewalls 40, 41, project outwardly from the surface 28 of the cylinder body, on either side of slot 26. Sidewalls 40, 41 are preferably formed in one piece with cylinder body 12, and each has a distal (free) end 43, 44, respectively, with a wedge shape in cross-section. The point of the wedge of each sidewall directed generally inwardly toward the other sidewall. The sidewalls are preferably symmetrical, and referring to sidewall 40 illustrated in FIG. 8, the wedge-shaped end 43 is defined by a first, flat, longitudinally-extending surface 47 facing outwardly, away from surface 28, and preferably parallel to surface 28; and a second, flat, longitudinally-extending surface 51 facing generally inwardly toward surface 28, at an angle to surface 47. Inwardly-facing surface 51 preferably extends at an angle of about 45 degrees with respect to the outwardly-facing surface 47. The outwardly and inwardly-facing surfaces 47, 51 are interconnected by a rounded edge 54 defining the "point" of the wedge. Again, sidewall 40 has the same (but symmetrical) structure as sidewall 41.

Appropriate grooves 55 can be formed at various locations along the other side surfaces of the cylinder body to facilitate mounting the cylinder body to a support surface or stand, as is well known. Position sensors, shock absorbers, hard stops, brakes, and the like, can also be mounted to grooves 55. Also, the inner angled surface of members 40, 41 of the cylinder body 12 could be used to retain shock absorbers, hard stops, brakes and the like.

Figure 9:
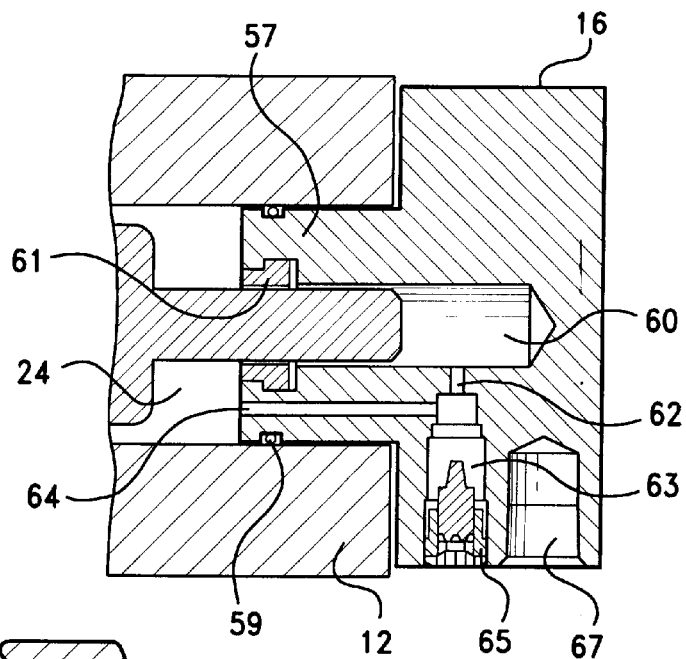
FIG. 9 is a cross-sectional end view of the rodless cylinder taken substantially along the plane described by the lines 9—9 of FIG. 1.

The end caps 16, 18 are located at each end of the cylinder body to fluidly-seal the ends of bore 24. The end caps are similar, and are preferably formed from the same material as the cylinder body, for example an extruded metal such as aluminum. The upper surface of the end caps also have a similar configuration as the upper surface of the cylinder body, that is, with a pair of sidewalls 56 (FIG. 7) with inwardly-directed, wedge-shaped distal ends, although the sidewalls could also be directed vertically upward and then have lateral, opposed shoulders. Referring to end cap 16 illustrated in FIGS. 9, 10 and 11, end cap 16 includes a pilot cylinder 57 extending longitudinally away a short distance from the end cap along the longitudinal axis of the cylinder body. The pilot cylinder 57 has an outer diameter just slightly less than the inner diameter of cylinder bore 24. A resilient O-ring seal 59 is received in a groove around the periphery of the pilot cylinder to fluidly seal the pilot cylinder to the cylinder body.

Figure 11:
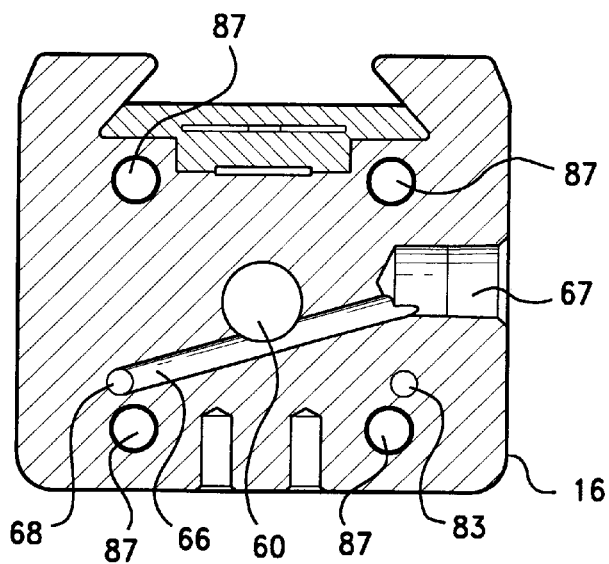
FIG. 11 is a cross-sectional end view of the rodless cylinder taken substantially along the plane described by lines 11—11 of FIG. 1.

The pilot cylinder also includes a central blind end bore 60, extending from the inner end of the pilot cylinder. A resilient annular cushion seal 61 is supported within bore 60, proximate the inner end of the pilot cylinder. Bore 60 extends partially through the end cap and is fluidly connected by a small radial bore 62 to a larger radial bore 63. A small axial bore 64 extends through pilot cylinder 57 from bore 24 and is also fluidly connected to radial bore 63. An adjustable needle valve assembly 65 is located on the axis of bore 62 (and bore 63) to meter the flow of fluid from cylinder bore 24 to the central bore 60. Bore 60 is further fluidly connected by bore 66 to a first port 67. Fluid directed through first port 67 is directed to central bore 60, and also metered cylinder bore 24 through bore 64, depending upon the position of needle valve 65. As can be seen in FIG. 11, passage 66 also extends to a long axial bore 68. Axial bore 68 extends from end cap 16, through cylinder body 12, and into the opposite end cap 18 (see FIG. 14). The end of passage 68 in end cap 18 is then fluidly connected by bore 69 to a second port 70 in end cap 18. As should be apparent, either of ports 67 or 70 could be used to direct fluid to (or from) the end of the cylinder bore 24 through end cap 16. This provides flexibility in connecting the cylinder within a fluid system, in that either or both ports 67 or 70 could be used to provide fluid to the one end of the cylinder bore (the other port may be capped).

Figure 12:
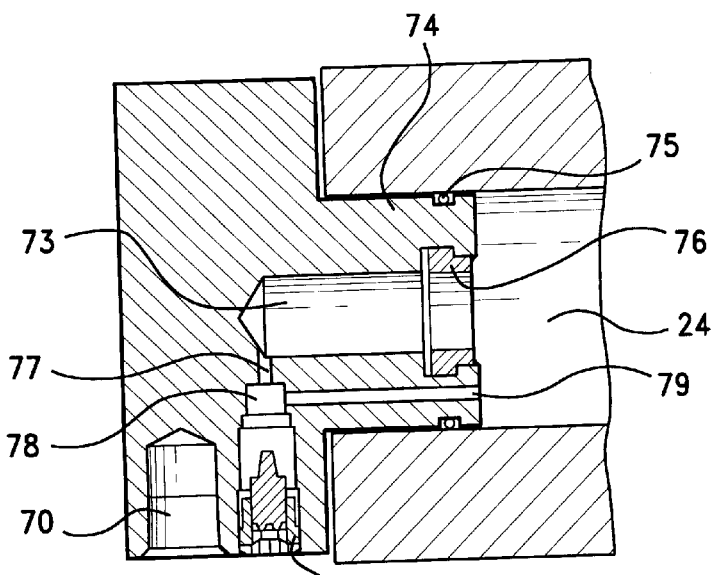
FIG. 12 is a cross-sectional end view of the rodless cylinder taken substantially along the plane described by the lines 12—12 of FIG. 1.
Figure 13:
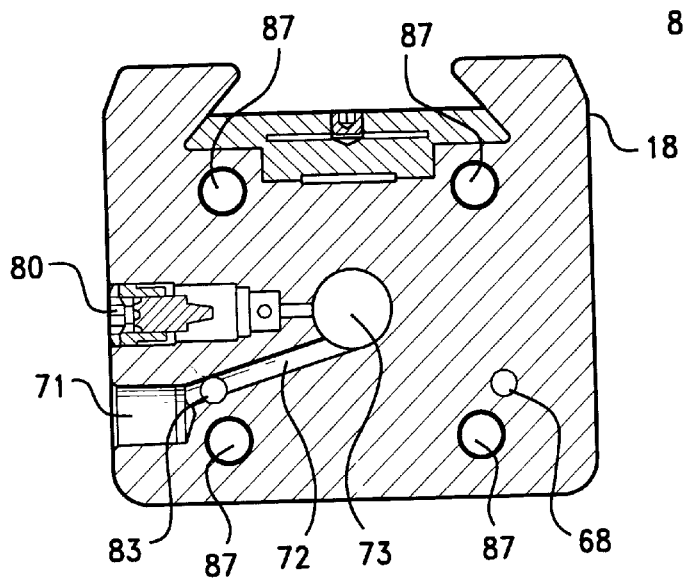
FIG. 13 is a cross-sectional end view of the rodless cylinder taken substantially along the plane described by the lines 13—13 of FIG. 1.
Figure 14:
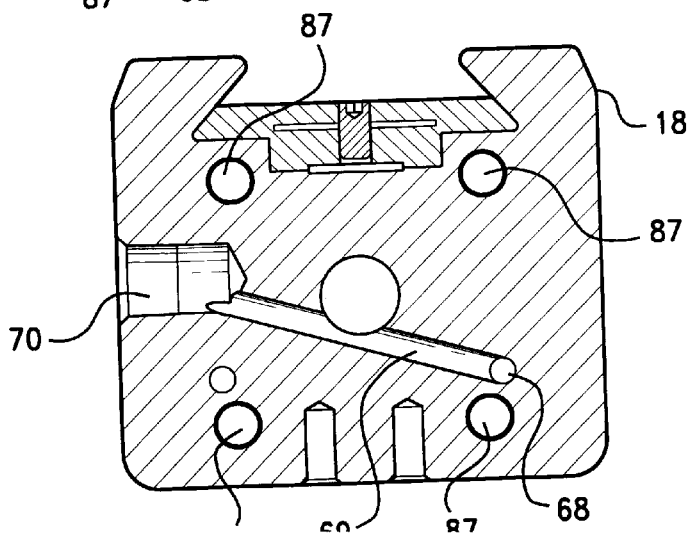
FIG. 14 is a cross-sectional end view of the rodless cylinder taken substantially along the plane described by the lines 14—14 of FIG. 1.

As shown in FIGS. 12–14, end cap 18 similarly includes a third port 71 which is fluidly connected by passage 72 to a central blind bore 73 in end cap 18. Central bore 73 is formed in pilot cylinder 74 in end cap 18, and also extends a short distance along the longitudinal axis of the cylinder body. Pilot cylinder 74 has an outer diameter slightly less than the cylinder bore 24, and a resilient O-ring seal 75 is located in a groove in the periphery of the pilot cylinder to seal the pilot cylinder within the bore of the cylinder body.

A resilient annular cushion seal 76 is also located in the central bore 73, and bore 73 is connected by small radial bore 77 to larger radial bore 78. A small axial bore 79 also extends through pilot cylinder 74 to fluidly connect cylinder bore 24 with radial bore 78. An adjustable needle valve assembly 80 is located in radial bore 78 to meter the fluid between cylinder bore 24 and central bore 73.

Figure 10:
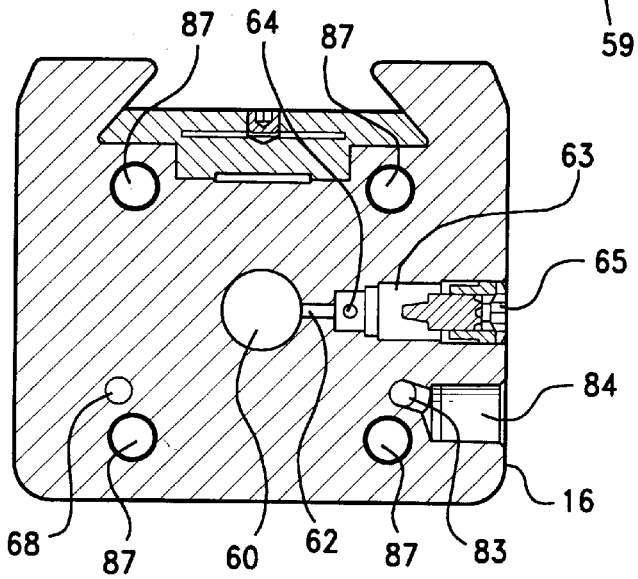
FIG. 10 is a cross-sectional end view of the rodless cylinder taken substantially along the plane described by the lines 10—10 of FIG. 1.

Third port 71 in end cap 18 is also fluidly connected by bore 72 to another long axial bore 83 extending from end cap 18, through cylinder body 12 to opposite end cap 16 (see FIG. 10). Bore 83 is fluidly connected in end cap 16 to a fourth port 84. As again should be realized, fluid applied to (or directed from) either of ports 72 and 84 will be applied to the end of the cylinder bore through end cap 18. Again, this allows for flexibility in connecting the cylinder in a fluid system, with one or both of the ports being used to supply fluid to the other end of the cylinder bore (and the other port may be capped). Appropriate O-ring seals 85 are used to fluidly seal the long axial bores 68, 83 between the end caps 16, 18 and the cylinder body 12. While ports 67, 70, 71 and 84 are illustrated as opening along the side of surface end caps 16, 18, it should be noted that one or both of these ports could be formed along the end surface of end cap 16, depending upon the particular application.

Figure 7:
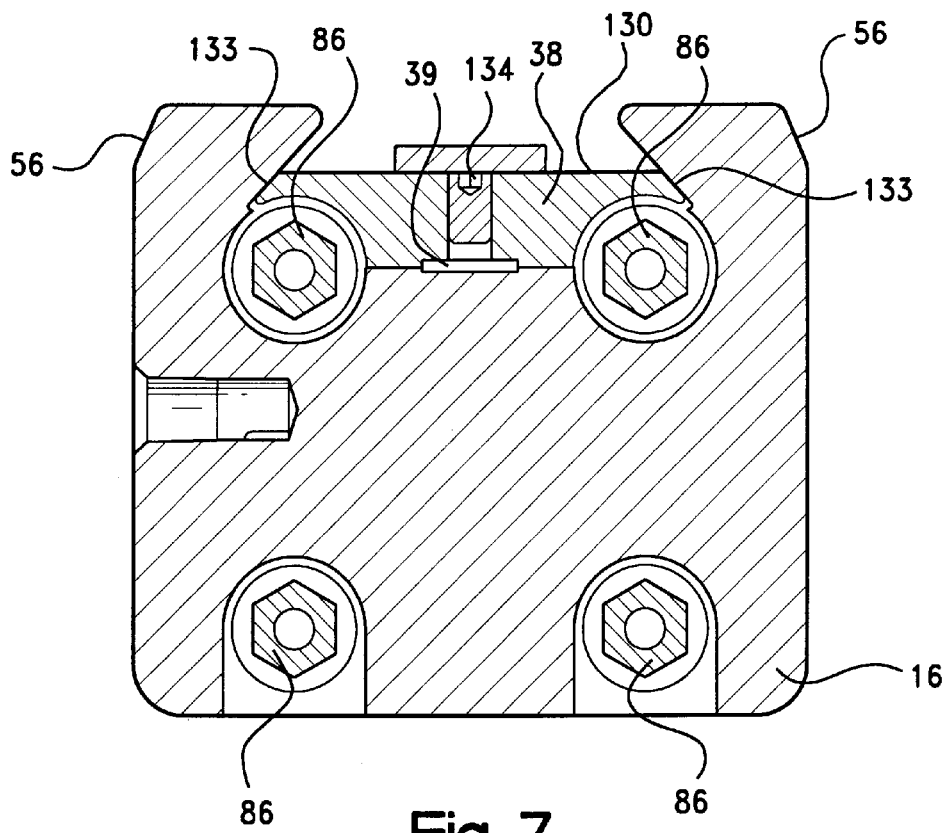
FIG. 7 is a cross-sectional end view of the rodless cylinder taken substantially along the plane described by the lines 7—7 of FIG. 1.

As shown in FIGS. 2 and 7, bolt-type fasteners, indicated generally at 86, are received in through-bores 87 in end caps 16, 18 (FIG. 3) and corresponding through-bores 88 in cylinder body 12 to secure the end caps to the cylinder body.

Referring now to FIGS. 2–6, a piston assembly, indicated generally at 90, is disposed within bore 24, and reciprocates therein. Piston assembly 90 comprises a cylinder piston body 91 formed from a pair of identical body halves 92, 93, a yoke member 95 which retains the body halves together, and a coupler member 96 extending outwardly through longitudinal slit 26 which connects the piston body and yoke member to the slide table 20. The piston body 91 includes a pair of resilient annular piston seals 97, 98, one located at each end of the piston body, which are designed to fluidly-seal against the inner surface of bore 24 as the piston reciprocates.

Figure 4:
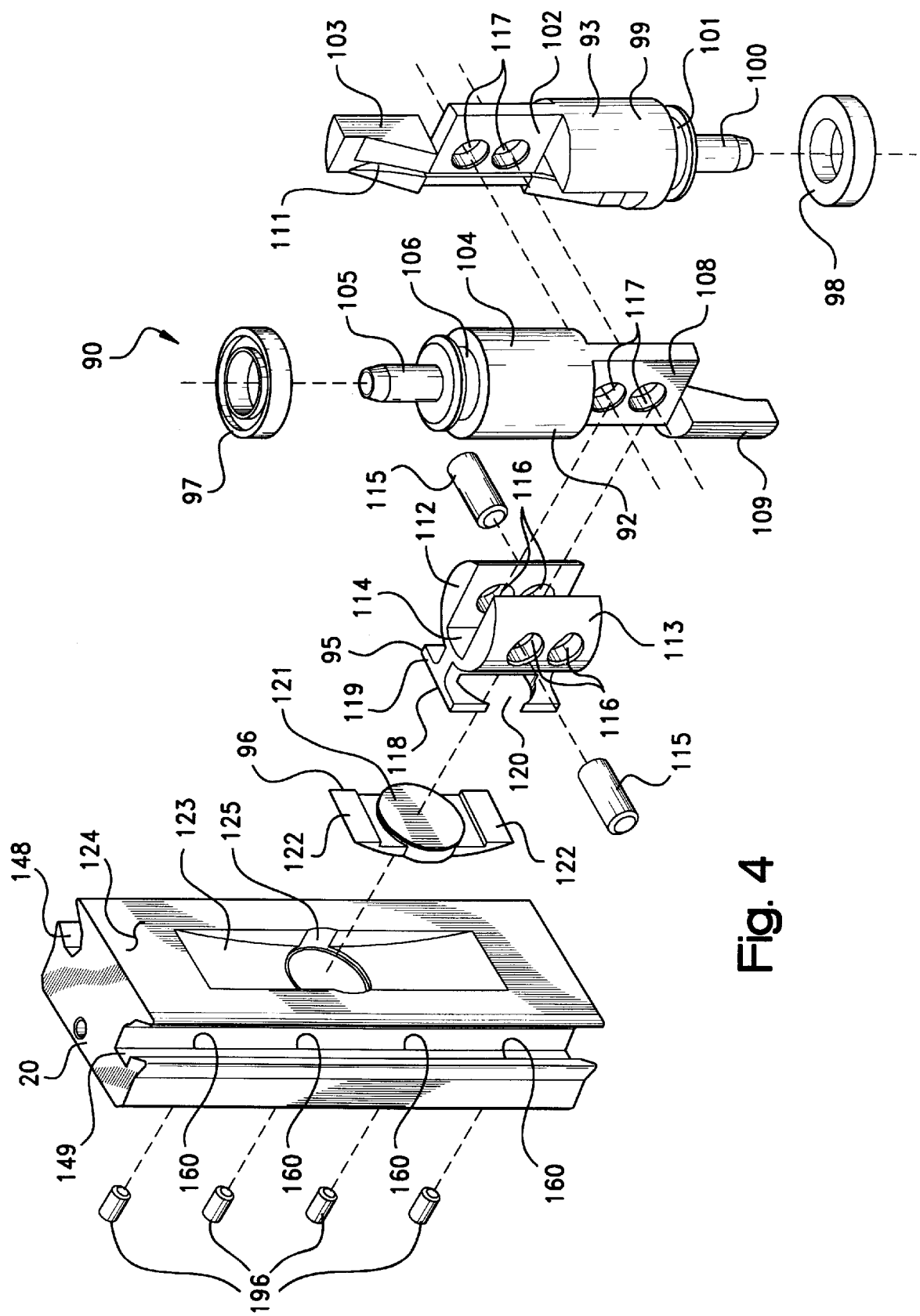
FIG. 4 is an exploded assembly view of the different components of the piston assembly and slide table of FIG. 1.

As shown in particular in FIGS. 4 and 5, piston body half 93 includes at one end a cylindrical piston head 99 with a cylindrical post or spear 100 extending away from the piston head along the central axis of the piston body (and hence, along the longitudinal axis of the cylinder body), and a groove 101 to receive piston seal 98; and at the other end an elongated, essentially rectangular flange 102 extending away from the piston head to a rear body portion 103. The other body half 92 is identical in structure to body half 93, and includes a cylindrical piston head 104, a cylindrical post or spear 105 along the central axis of the piston body, a groove 106 to receive the other piston seal 97, an elongated flange 108, and a rear body portion 109. The piston halves are preferably formed (e.g., molded) from a rigid, wear-resistant, low-cost material, such as a synthetic resin.

A passage 110 (see also FIGS. 3 and 6) for the inner sealing band 39 extends longitudinally through the piston body and is formed between body half 92 and body half 93. A channel 111 forming one side of the band passage is visible in body half 93 (FIG. 4) and extends from one open end at location just inward of groove 101, to another open end at a location just inward of rear body portion 103. A similar channel is formed in body half 92 to complete the band passage 110.

Figure 6:
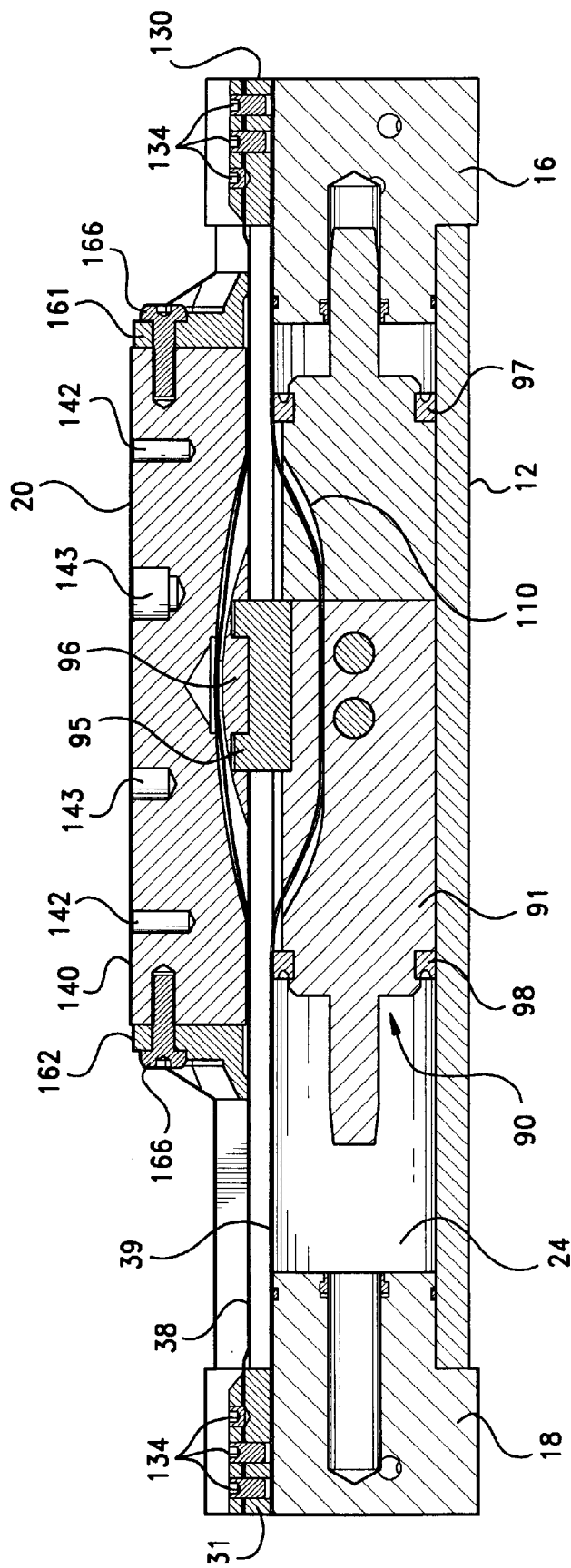
FIG. 6 is a cross-sectional side view of the rodless cylinder taken substantially along the plane described by the lines 6—6 of FIG. 1.

When assembled, the body halves axially overlap, with body half 92 mating with body half 93 to make up the complete piston body 91. The flange 102 in body half 93 is aligned with flange 108 in body half 92, and the cylindrical posts 100, 105 of piston heads 99, 104 extend in opposite directions. The rear body portions 103, 109 fit within corresponding cavities formed in the opposite piston head. As can be seen in FIG. 6, band passage 110 extends through the piston body from a first open end just inward of seal 98 at one end of the piston body, to another open end just inward of seal 97 at the other end of the piston. As will be described below, inner band 39 is directed through passage 110 as the piston body moves in bore 24. Piston body 91 fits closely within bore 24 in cylinder body 12, with piston seals 97, 98, providing a fluid seal with the bore at each end of the piston, but allowing reciprocal motion of the piston.

Referring again to FIGS. 4 and 5, yoke 95 includes a pair of generally parallel arms 112, 113, extending outwardly from an end wall 114. Arms 112, 113 closely receive and surround the flanges 102, 108 of body halves 92, 93, and have an outer dimension substantially matching the outer configuration of the body halves to create a unitary shape when assembled (see FIG. 5). Magnets 115 are received in openings 116 in yoke arms 112, 113 and in corresponding openings 117 in flanges 102, 108, to provide position sensing capability (with remote magnetic sensors). A T-shaped base 118 extends away from end wall 114 of yoke 95. When the piston body is located in bore 24, base 118 extends through slot 26 in cylinder body 12, with the head 119 of the base disposed outwardly from and relatively parallel to the outer surface 28 of the cylinder body 12.

The base 118 of the yoke is press-fit with coupler member 96. To this end, head 119 of base 118 has a central circular opening 120 which closely receives a disk-shaped member 121 of coupler member 96, which is also exterior to the cylinder body 12. Base 118 has a configuration surrounding circular opening 120 which is also closely received between disk-shaped member 121 and a pair of end tabs 122 of coupler 78, so that yoke 95 is securely fixed to coupler 96 and moves in conjunction therewith. The end tabs 122 extend outwardly from opposite sides of the disc-shaped member 121. Alternatively, as shown in FIG. 4A, base 118 of yoke 95 could have a pair of semi-circular recesses as at 120a, and the disk-shaped member could be defined by a pair of semi-circular members 121a, which are closely received in the recesses to retain the yoke 95 on coupler member 96. In any case, the yoke 95 is preferably formed in one-piece from extruding a metal such as aluminum, while coupler member 96 is preferably molded in one-piece from an appropriate inexpensive, light-weight and long-lasting material, such as synthetic resin or powdered metal.

Coupler member 96 is received within a recess 123 formed in the lower, inside surface 124 of slide table 20. Recess 123 has a center, circular opening 125 with a configuration that closely receives the disk-shaped member 121 of coupler member 96, preferably with a press-fit. End tabs 122 are also closely received within recess 123, surrounding circular opening 125. Disk-shaped member locates the coupler member 96 on the lower surface of slide table 20, and causes the slide table to move longitudinally in conjunction with the piston body in the cylinder bore 24. The disk-shaped member can rotate slightly and move axially (up and down) a certain amount within the circular opening 125 to allow some off-axis movement of the slide table 20 with respect to the piston body 91 without causing the piston body 91 to bind within the cylinder bore 24, or damage the piston seals 97, 98. Off-axis components of motions such as caused by the un-even loading of the slide table 20 will therefore not effect the smooth movement of the piston 71 within the bore, and will thereby retain the load stresses on the bearing structure rather than on the piston members.

The inside end of the disk-shaped member 121 is spaced somewhat from the inside surface of the opening 123 formed in the slide table. As can be seen in FIG. 6, the outer band 38 extends through in this gap. The end tabs 122 of coupler 96 have a tapered configuration which forms an extended arc along the longitudinal axis. The tabs separate outer band 38 from its magnetic coupling to magnetic strips 34 as the slide table reciprocates along the cylinder body. The outer band 38 re-couples to the magnetic strip after the slide table 20 passes to prevent particles, etc. from entering the cylinder bore 24.

As shown in FIGS. 6 and 7, outer band 38 and inner band 39 are secured to the end caps 16, 18 by band clamps 130, 131, respectively. Outer band 38 is received in a slot formed in each band clamp, while inner band 39 is received between the clamp and the associated end cap. Each band clamp is preferably formed from injection molded metal and is configured to be closely received within the wedge-shape sidewalls 56 of the end caps. While the band clamps are illustrated as being provided in one piece, the clamps would be provided in two pieces if necessary or desirable to facilitate the attachment of the inner and outer bands to the end caps Threaded fasteners 134 are received in throughholes in band clamps 130, 131 to retain the bands to the clamp and corresponding end cap. The innermost of the screws engages the outer band, while the remaining screws pass through the band clamp to engage the inner band against the end cap surface 28. Fasteners 134 also facilitate wedging the outer angled surfaces 133 (see FIG. 7) of the band clamps against the inner angled surfaces of the sidewalls 56 of the end cap to fixedly retain the band clamps to the end cap.

Referring again to FIGS. 2–6, the slide table 20 for the rodless cylinder preferably also comprises an elongated member preferably formed by extruding a metal such as aluminum. The table includes a flat top surface 140 to allow machinery or workpiece components to be easily mounted thereon. Threaded bores 142 and locating dowel pin holes 143 are also provided for this purpose. The flat lower surface 124 of the slide table faces inward toward the cylinder body 12, and is essentially parallel to upper surface 28. Lower surface 124 is spaced apart from upper surface 28 an amount sufficient to receive upper band 38 therebetween (see FIGS. 3 and 6). The length of slide table 20 (and the length of the cylinder body 12), is dependent upon the particular application.

Figure 8:
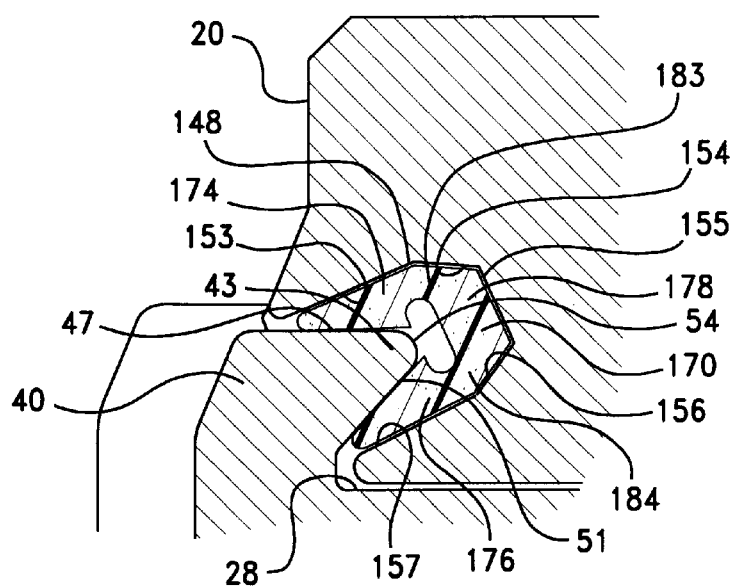
FIG. 8 is a cross-sectional enlarged view of a portion of the rodless cylinder of FIG. 3.

The slide table 20 includes channels 148, 149, along either edge of the slide table, extending longitudinally along the length of the table from one end to the other. Each channel is directed downwardly towards the upper surface of the cylinder body, and somewhat slightly outwardly. Each channel is shown as being defined by a series of discrete wall segments, although it is noted that the channels could also be relatively smooth. Referring now to FIG. 8, five wall segments 153–157 are shown for channel 148. The outermost wall segments of each channel (segments 153 and 157) are preferably parallel to the opposing wall segment. The innermost wall segment (segment 155) is preferably substantially perpendicular to the outermost wall segments 153, 157. The number and configuration of the discrete wall segments could also vary depending upon the particular application. Channel 149 preferably has the same geometry as channel 148, extending downwardly and outwardly from the other side of the slide table.

As shown in FIG. 3, an additional channel 158 is preferably formed parallel to channel 149 along the length of the slide table. The additional channel 158 opens into channel 149 along the entire length of channel 149. A series of bores 160 are formed (drilled) vertically through the slide table into channel 158. Four of bores 160 are shown in FIG. 4, equally-spaced along the slide table, although the number and location of these bores can vary. The function of channel 158 and bores 160 will be described herein in more detail.

Referring again to FIGS. 2 and 6, an end wiper 161, 162 is attached to each end of the slide table. Bolts 166 extend through holes formed in each end wiper, and into corresponding bores formed in the slide table for this purposes. Each wiper 161, 162 has a lower flat surface which presses the outer band 38 downwardly against the upper surface 28 of the cylinder body as the slide table moves along the body. The wipers also help remove any foreign objects which might be unintentionally located in the path of movement of the slide table 20.

To enable the slide table to move smoothly against the cylinder body, a bearing member 170, 172 is disposed in each channel 148, 149, respectively, in the slide table 20. Each bearing member is a one-piece elongated member formed from an appropriate wear-resistant material, such as a synthetic resin material (e.g., black acetal resin or Delrin®) or PBT polyester resin. Each bearing member is preferably as long as the associated bearing channel, and is held in its channel by the end wipers 161, 162 mounted at the ends of the slide table.

The bearing members 170, 172 preferably have an identical configuration. Referring again to FIG. 8, bearing member 170, for example, is shown with a generally V-shaped configuration which is closely received in the associated bearing channel 148 on one side of the slide table, and which receives the associated wedge-shaped sidewall 40 extending upwardly from the cylinder body 12. Bearing member 170 includes a first longitudinally-extending sidewall 174, a second longitudinally-extending sidewall 176, and a longitudinally-extending end wall 178, interconnecting first sidewall 174 and second sidewall 176. Sidewalls 174 and 176 include outer surfaces which are substantially parallel to one another, and which are located flush against inside walls 153, 157, respectively, of channel 148. Similarly, end wall 178 includes an outer surface extending substantially perpendicular to the outer surfaces of sidewalls 174, 176, and which is flush against inside wall 155 of channel 148. Bearing member also includes angled side surfaces 183, 184, interconnecting end wall surface 182 and sidewall surfaces 180, 181, which are flush against wall segments 154 and 156, respectively, of channel 148.

Again, channels 148, 149 in slide table 20 can have other configurations rather than the discrete wall-segment configuration described above, in which case, the outer surface of the bearing members 170, 172 would have a corresponding configuration such that the outer surfaces of the bearing member are flush against the inside surface of the channel. It is noted that the complimentary discrete surface segments of the bearing members and channels properly locate the bearing member and prevent the bearing member from rotating within their channels.

Sidewalls 174, 176 of bearing member 170 also include inside surfaces, which generally face inwardly toward each other, and which are located flush against the surfaces 47, 51 of the cylinder sidewall 40. The sidewalls of the bearing member narrow or taper down to their outer edge, with the inside surfaces of the sidewalls 174, 176 preferably extending at an acute angle of about 45 degrees with respect to one another, and at about a 22.5 degree angle relative to their associated outer sidewall surface. A cavity or recess 190 is provided between the sidewalls 174, 176 and end wall 178 to allow easy expansion of the sidewalls, and to allow the wedge-shaped sidewalls 40, 41 to be fully received within the associated bearing member. Again, bearing member 172 is identical to member 170, is closely received in the associated bearing channel 149 on the other side of the slide table, and receives the associated wedge-shaped sidewall 41 extending upwardly from the cylinder body.

Slide table 20 can be easily assembled, by initially sliding the bearing members 170, 172 into their associated channels, from either end of the slide table. The inner sealing band 39 is then fed through the passage in the piston 91, and the slide table is then slid onto the cylinder body from one end. The outer sealing band 38 is fed through the passage between the coupler member and slide table after the slide table is installed. The end wipers 161, 162 are then attached to each end of the slide table. Finally, the end caps 16, 18 are fixed to the cylinder body and the bands are clamped by band clamps 130, 131 to the end caps.

When the slide table 20 slides against cylinder body 12, the bearing members 170, 172 support both vertical and horizontal loads on the table. Vertical loads are supported primarily by the upper sidewall 174 of the bearing members, while horizontal loads are supported primarily by the lower sidewall 176. The synthetic resin members provide wear resistance as well as good sliding characteristics. The bearing members are easy to assemble in the channels of the slide table, and provide smooth movement of the table relative to the cylinder body under various load conditions.

At least one of the bearing members 170, 172 is adjustable to allow for the correct positioning of the bearing members within the channel relative to the cylinder body. To this end, a lever bar or rod 194 is provided between the bearing member 172 and the slide table 20. Lever bar 194 preferably comprises an elongated extruded aluminum member which is received in channel 158 opening along one side of bearing channel 149. Wedge bar 194 supports a portion of the bearing and is adjustable by a series of set screws 196 received in bores 160. Any of set screws 196 can be upwardly-or downwardly- adjusted by application of a tool such as an allen wrench to adjust a corresponding portion of the lever bar 194, and hence the bearing member 170. The position of bearing member 170 relative to the slide table 20 is likewise adjusted when the lever bar is moved against bearing member 172.

The operation of the slide table will now be briefly discussed. When fluid is introduced into one of the ports in the cylinder body, for example first port 67 or second port 70 (whichever is being used), the fluid pressure within bore 24 between the corresponding end cap 16 and the end of the piston body 91 increases, while at the same time fluid is relieved through third port 71 or fourth port 84 (whichever is being used), to decrease the fluid pressure between the other end cap and the other end of the piston body. The lip seals 97, 98 fluidly separate the ends of the piston body, and as a result, the piston is moved toward the lower-pressure side of the bore. As should be appreciated, if fluid is introduced through the third port 71 or fourth port 84 and drawn off from first port 67 or second port 70, the opposite effect will occur, and piston body 90 will move in the opposite direction. The slide table 20, being coupled to piston body 90 through coupler member 96, moves longitudinally in conjunction with the piston. By carefully metering fluid into one port or the other, smooth, accurate movement of the piston can be obtained.

As the piston moves, coupler member 96 separates outer band 38 from its magnetic coupling to the magnetic strips 34, while end wipers 161, 162 push the outer band back into magnetic coupling when the piston has passed. This allows the coupler to pass along the slot 26 in the cylinder body without allowing contamination to enter the bore 24. At the same time, inner band 39 is drawn through passage 110 formed in the piston body and pulled away from its fluid-tight engagement with the inside surface of bore 24 on either side of slot 26. The inner band is only released from its fluid-tight engagement with bore 24 within the area bounded by the piston seals 80, 82. The configuration of passage 110, as well as the lip seals 97, 98, pushes the band back into engagement with the cylinder body surrounding the slot after the piston passes. This allows the coupler to pass along the slot without pressure loss from the cylinder.

The longitudinal movement of slide table 20 is cushioned by the cylindrical posts 110, 105 at either end of the piston body which enter the openings 60, 73 in the end caps 16, 18, respectively, upon maximum movement of the slide table in either direction. Cushion seals 61, 76 seal against the cylindrical posts when the post enters the opening, thus creating a high pressure fluid zone ahead of the post. The pressure is relieved through passages 64, 79 which gently, but rapidly slows the further travel of the piston, depending upon the setting of needle valve assemblies 65, 80. This provides for rapid, controlled movement of the piston toward (and away) from an associated end cap. The operation of the slide table is identical in either direction.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A rodless cylinder, comprising:
    a cylinder body with a longitudinal bore closed at both ends, a piston which reciprocates inside the bore of the cylinder body, a slot along a surface of the body communicating the bore to the exterior of the body, and a slide table which is connected by a coupler member extending through the slot to the piston and which moves in conjunction with the piston along the surface of the cylinder body;
    the cylinder body including a pair of longitudinally-extending, spaced-apart sidewalls projecting axially away from the surface of the body toward the slide table, and inwardly toward each other, the sidewalls of the cylinder body each defining a wedge-shaped bearing surface;
    the slide table including a pair of longitudinally-extending, spaced-apart channels directed toward the cylinder body; and
    a pair of elongated, generally V-shaped one-piece bearing members interposed between the slide table and the cylinder body for slidably supporting the slide table on the cylinder body, each of the bearing members being received in a respective channel in the slide table and receiving the wedge-shaped bearing surface of a respective sidewall of the cylinder body.

2. The rodless cylinder as in claim 1, wherein each bearing member includes an outer surface supported by the channel, and an inner surface defining a cavity receiving the respective sidewall of the cylinder body.

3. The rodless cylinder as in claim 2, wherein each sidewall includes a first surface facing generally outwardly from the cylinder body, and a second surface facing generally inwardly toward the cylinder body, the first and second surfaces defining the wedge-shaped bearing surface, and the bearing member includes a first inner wall surface disposed against the outwardly-facing surface of the respective sidewall, and a second inner wall surface disposed against the inwardly-facing surface of the respective sidewall.

4. The rodless cylinder as in claim 3, wherein the outwardly-facing surface of each sidewall of the cylinder body extends substantially parallel to the longitudinal axis of the cylinder body, and the inwardly-facing surface of each sidewall extends at an acute angle to the outwardly-facing surface.

5. The rodless cylinder as in claim 4, wherein each bearing member surrounds the wedge-shaped bearing surface of the respective sidewall.

6. The rodless cylinder as in claim 5, wherein the inner wall surfaces of the bearing member are in direct engagement with the wedge-shaped bearing surface of the respective sidewall.

7. The rodless cylinder as in claim 1, wherein each bearing member includes a first longitudinally-extending wall and a second longitudinally-extending wall together defining a V-shape in cross-section, the first and second walls of the bearing member being fixedly and unitarily connected together along adjacent side edges.

8. The rodless cylinder as in claim 7, wherein the walls of each bearing member extend at an angle of 45 degrees with respect to one another.

9. The rodless cylinder as in claim 7, wherein the first and second walls of each bearing member have an outwardly-facing surfaces, the outwardly-facing surface of the first wall being parallel to the outwardly-facing surface of the second wall, for each bearing member.

10. The rodless cylinder as in claim 7, wherein the first and second walls of each bearing member narrow down from the connected side edge to a distal, free edge.

11. The rodless cylinder as in claim 7, wherein the first and second walls of each bearing member have inwardly-facing surfaces which narrow together toward the connected side edge of the walls, and an enlarged recess is provided between an inner end of the inwardly-facing surfaces and the connected side edge to allow expansion of the walls relative to each other to receive associated cylinder body sidewalls.

12. The rodless cylinder as in claim 1, wherein the V-shaped bearing members are each formed from a wear-resistant material.

13. The rodless cylinder as in claim 1, further including an adjustment device for adjusting the position of one of the V-shaped bearing members relative to the bearing surface.

14. The rodless cylinder as in claim 1, further including a sealing band which engages one of said piston and said slide table so as to at least partially cover the slot in the cylinder body.

15. The rodless cylinder as in claim 1, wherein one of the bearing members is adjustably located in the respective channel and can move relative to the slide table.

16. The rodless cylinder as in claim 15, wherein each sidewall of the cylinder body has an outwardly-facing bearing surface and an inwardly-facing bearing surface, and the one bearing member is supported by an outwardly-facing surface of the respective sidewall of the cylinder body.

17. The rodless cylinder as in claim 16, wherein the one bearing member is supported directly against the respective sidewall of the cylinder body.

18. The rodless cylinder as in claim 1, wherein the channels in the slide table each include a pair of longitudinally-extending, parallel, opposing wall segments.

19. A rodless cylinder, comprising:
   a cylinder body with a longitudinal bore closed at both ends, a piston which reciprocates inside the bore of the cylinder body, a slot along a surface of the body communicating the bore to the exterior of the body, and a slide table which is connected by a coupler member extending through the slot to the piston and which moves in conjunction with the piston along the surface of the cylinder body;
   the cylinder body including a pair of longitudinally-extending, spaced-apart sidewalls projecting axially away from the surface of the body toward the slide table, and inwardly toward each other, the sidewalls of the cylinder body each defining a wedge-shaped bearing surface;
   the slide table including a pair of longitudinally-extending, spaced-apart channels directed toward the cylinder body; and
   a pair of elongated, generally V-shaped bearing members interposed between the slide table and the cylinder body for slidably supporting the slide table on the cylinder body, each of the bearing members being received in a respective channel in the slide table and receiving the wedge-shaped bearing surface of a respective sidewall of the cylinder body wherein each bearing member includes a first longitudinally-extending wall and a second longitudinally-extending wall together defining a V-shape in cross-section, and a longitudinally-extending end wall interconnecting the first and second walls of the bearing member.

20. The rodless cylinder as in claim 19, wherein the first and second walls and end wall of each bearing member are unitary with one another.

21. A rodless cylinder, comprising:
   a cylinder body with a longitudinal bore closed at both ends, a piston which reciprocates inside the bore of the cylinder body, a slot along a surface of the body communicating the bore to the exterior of the body, and a slide table which is connected by a coupler member extending through the slot to the piston and which moves in conjunction with the piston along the surface of the cylinder body;
   the cylinder body including a pair of longitudinally-extending, spaced-apart sidewalls projecting axially away from the surface of the body toward the slide table, and inwardly toward each other, the sidewalls of the cylinder body each defining a wedge-shaped bearing surface;
   the slide table including a pair of longitudinally-extending, spaced-apart channels directed toward the cylinder body; and
   a pair of elongated, generally V-shaped bearing members interposed between the slide table and the cylinder body for slidably supporting the slide table on the cylinder body, each of the bearing members being received in a respective channel in the slide table and receiving the wedge-shaped bearing surface of a respective sidewall of the cylinder body; wherein an end wiper is attached to each end of the slide table, the bearing members extending along the slide table from one end wiper to the other end wiper, and the end wipers and channel of the slide table retaining the bearing members on the slide table.

22. A rodless cylinder, comprising:
   a cylinder body with a longitudinal bore closed at both ends, a piston which reciprocates inside the bore of the cylinder body, a slot along a surface of the body communicating the bore to the exterior of the body, a slide table which is connected by a coupler member extending through the slot to the piston and which moves in conjunction with the piston along the surface of the cylinder body, and a sealing member which engages one of said piston and said slide table so as to at least partially cover the slot in the cylinder body;
   the piston including a pair of piston members and a yoke retaining the piston members together, each of said piston members including a cylindrical body portion, a head member extending axially away from the body portion at one end of the piston and directed toward opposite ends of the longitudinal bore, and an attachment flange extending axially away from the body portion at the other end of the piston, the attachment flanges of the piston members being axially overlapped and received within the yoke;
   the cylinder body including a pair of longitudinally-extending, spaced-apart sidewalls projecting axially away from the surface of the body toward the slide table, the sidewalls of the cylinder body each defining a wedge-shaped bearing surface;
   the slide table including a pair of longitudinally-extending, spaced-apart channels directed toward the cylinder body; and
   a pair of elongated, V-shaped bearing members interposed between the slide table and the cylinder body for slidably supporting the slide table on the cylinder body, each of the bearing members being received in a respective channel in the slide table and receiving the wedge-shaped bearing surface of a respective sidewall of the cylinder body.

23. The rodless cylinder as in claim 22, wherein the yoke includes a pair of yoke arms extending along one side of each flange, and further including magnets extending through the yoke arms and both flanges.

24. The rodless cylinder as in claim 22, wherein the piston members are identical to one another.

25. The rodless cylinder as in claim 22, wherein each bearing member includes an outer surface supported by the channel, and an inner surface defining a cavity receiving the respective sidewall of the cylinder body.

26. A rodless cylinder, comprising:
   a cylinder body with a longitudinal bore closed at both ends, a piston which reciprocates inside the bore of the cylinder body, a slot along a surface of the body communicating the bore to the exterior of the body, a slide table which is connected by a coupler member extending through the slot to the piston and which moves in conjunction with the piston against the surface of the cylinder body, and a sealing member which engages one of said piston and said slide table so as to at least partially cover the slot in the cylinder body,
   the piston including a pair of piston members and a yoke retaining the piston members together, each of said piston members including a cylindrical body portion, a head member extending axially away from the body portion at one end of the piston toward opposite ends of the longitudinal bore, and an attachment flange extending axially away from the body portion at the other end of the piston, the attachment flanges being axially overlapped and received within the yoke; and bearing members disposed between the slide table and the cylinder body for slidably supporting the slide table on the cylinder body.

27. A rodless cylinder, comprising:

a cylinder body with a bore extending along the longitudinal axis of the body and closed at both ends, a piston which reciprocates inside the bore of the cylinder body, a slot along a surface of the body communicating the bore to the exterior of the body, a slide table which is connected by a coupler member extending through the slot to the piston and which moves in conjunction with the piston against the surface of the cylinder body, and a sealing band extending through a passage between said piston and said slide table so as to at least partially cover the slot in the cylinder body, the piston having a cylindrical configuration with a head member extending axially away from opposite ends of the piston toward opposite ends of the longitudinal bore, a yoke member connected to the piston and extending through the slot in the cylinder body, the coupler member connecting the yoke member to the slide table for longitudinal movement therewith, said coupler member allowing limited off-axis movement of the piston with respect to slide table and including a pair of end tabs projecting away from opposite ends of the coupler member through said passage, and which allow coupling and uncoupling of the sealing band to the cylinder body along the slot as the slide table moves along the cylinder body, and bearing members disposed between the slide table and the cylinder body for slidably supporting the slide table on the cylinder body.

28. The rodless cylinder as in claim 18, wherein said coupler member includes a portion which is press-fit within a circular recess in the slide table.

29. A rodless cylinder, comprising:

a cylinder body with a bore extending along the longitudinal axis of the body and closed at both ends, a piston which reciprocates inside the bore of the cylinder body, a slot along a surface of the body communicating the bore to the exterior of the body, a slide table which is connected by a coupler member extending through the slot to the piston and which moves in conjunction with the piston against the surface of the cylinder body, and a sealing band extending through a passage between said piston and said slide table so as to at least partially cover the slot in the cylinder body, the piston having a cylindrical configuration with a head member extending axially away from opposite ends of the piston toward opposite ends of the longitudinal bore, a yoke member connected to the piston and extending through the slot in the cylinder body, and a coupler member connecting the yoke member to the slide table for longitudinal movement therewith, said coupler member allowing limited off-axis movement of the piston with respect to slide table; and bearing members disposed between the slide table and the cylinder body for slidably supporting the slide table on the cylinder body; wherein said coupler member includes a disk-shaped portion, one end of which is press-fit within a circular recess in the slide table; and wherein said coupler member includes a pair of end tabs extending away from opposite ends of the disk-shaped portion through said passage, and which allow coupling and uncoupling of the sealing band to the cylinder body along the slot as the slide table moves along the cylinder body.

30. The rodless cylinder as in claim 29, wherein the yoke member includes a base having an opening closely receiving another end of the disk-shaped portion of the coupler member.

31. The rodless cylinder as in claim 30, wherein said coupler member is formed in one piece.

32. A rodless cylinder, comprising:

a cylinder body with a bore extending along the longitudinal axis of the body and closed at both ends, a piston which reciprocates inside the bore of the cylinder body, a slot along a surface of the body communicating the bore to the exterior of the body, a slide table which is connected by a coupler member extending through the slot to the piston and which moves in conjunction with the piston against the surface of the cylinder body, and a sealing band extending through a passage between said piston and said slide table so as to at least partially cover the slot in the cylinder body, the piston having a cylindrical configuration with a head member extending axially away from opposite ends of the piston toward opposite ends of the longitudinal bore, a yoke member connected to the piston and extending through the slot in the cylinder body, and a coupler member connecting the yoke member to the slide table for longitudinal movement therewith, said coupler member allowing limited off-axis movement of the piston with respect to slide table; and bearing members disposed between the slide table and the cylinder body for slidably supporting the slide table on the cylinder body; wherein said coupler member includes a disk-shaped portion, one end of which is press-fit within a circular recess in the slide table; and wherein the yoke member includes a base having a pair of semi-circular recesses, and the disk-shaped portion of the coupler member includes a pair of semi-circular portions, the semi-circular portions of the coupler member being closely received in the semi-circular recesses of the base.

33. A rodless cylinder, comprising:

a cylinder body with a bore extending along the longitudinal axis of the body and closed at both ends, a piston which reciprocates inside the bore of the cylinder body, a slot along a surface of the body communicating the bore to the exterior of the body, a slide table which is connected by a coupler member extending through the slot to the piston and which moves in conjunction with the piston against the surface of the cylinder body, and a sealing band extending through a passage between said piston and said slide table so as to at least partially cover the slot in the cylinder body, the piston having a cylindrical configuration with a head member extending axially away from opposite ends of the piston toward opposite ends of the longitudinal bore, a yoke member connected to the piston and extending through the slot in the cylinder body, wherein the coupler member has a disk-shaped member closely received in a circular opening in the yoke member.

* * * * *